US010817384B2

(12) United States Patent
Helliker et al.

(10) Patent No.: US 10,817,384 B2
(45) Date of Patent: *Oct. 27, 2020

(54) DATA MANAGEMENT SYSTEM WITH CONSOLE MODULE

(71) Applicant: Hitachi Vantara LLC, Santa Clara, CA (US)

(72) Inventors: Fabrice Helliker, Broadstone Dorset (GB); Simon Chappell, Broadstone Dorset (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 973 days.

This patent is subject to a terminal disclaimer.

(21) Appl. No.: 15/297,314

(22) Filed: Oct. 19, 2016

(65) Prior Publication Data

US 2017/0039113 A1 Feb. 9, 2017

Related U.S. Application Data

(63) Continuation of application No. 13/313,839, filed on Dec. 7, 2011, now Pat. No. 9,514,143.

(51) Int. Cl.
| | |
|---|---|
| *G06F 16/00* | (2019.01) |
| *G06F 11/14* | (2006.01) |
| *G06F 16/17* | (2019.01) |
| *G06F 16/11* | (2019.01) |
| *G06F 16/16* | (2019.01) |

(52) U.S. Cl.
CPC ...... *G06F 11/1464* (2013.01); *G06F 11/1461* (2013.01); *G06F 16/122* (2019.01); *G06F 16/168* (2019.01); *G06F 16/17* (2019.01); *G06F 2201/80* (2013.01)

(58) Field of Classification Search
CPC ...... G06F 16/951; G06F 16/44; G06F 16/638; G06F 16/9024; G06F 16/168
See application file for complete search history.

(56) References Cited

U.S. PATENT DOCUMENTS

| 9,042,263 B1* | 5/2015 | Yahalom | H04L 67/1097 370/253 |
|---|---|---|---|
| 2005/0195660 A1* | 9/2005 | Kavuri | G06F 3/0605 365/189.05 |
| 2007/0198690 A1* | 8/2007 | Kodama | G06F 16/90328 709/223 |
| 2010/0293112 A1* | 11/2010 | Prahlad | G06F 3/0605 705/418 |
| 2010/0293147 A1 | 11/2010 | Snow et al. | |
| 2011/0138154 A1 | 6/2011 | Tevis et al. | |
| 2012/0023544 A1 | 1/2012 | Li et al. | |

OTHER PUBLICATIONS

Sadiq, Shazia, et al. "Data flow and validation in workflow modelling." Proceedings of the 15th Australasian database conference—vol. 27. 2004.*

(Continued)

*Primary Examiner* — Nan Hutton
(74) *Attorney, Agent, or Firm* — Mattingly & Malur, PC (57) ABSTRACT

A data management system that is enabled such that the user can select a data source node, a repository and a data path, choose policies for each and distribute the policies to be managed by the management system.

20 Claims, 5 Drawing Sheets

(56) References Cited

OTHER PUBLICATIONS

Dogru, Sait, et al. "A graphical data flow language for retrieval, analysis, and visualization of a scientific database." Journal of Visual Languages & Computing 7.3 (1996): 247-265.*

Davis, Alan L., and Robert M. Keller. "Data flow program graphs." (1982).

Cranor, Charles D., et al. "Design and implementation of a distributed content management system." Proceedings of the 13th international workshop on Network and operating systems support for digital audio and video. ACM, 2003.

Buxton, William, et al. "Towards a comprehensive user interface management system." ACM SIGGRAPH Computer Graphics. vol. 17. No. 3. ACM, 1983.

* cited by examiner

| TYPE | EXAMPLE |
|---|---|
| DATA TYPE | DATABASE |
| | FILE SYSTEM |
| | STORAGE DEVICE |
| | |
| TIME | TIME OF DAY BACKED UP |
| | THE DAY OR DATES THE DATA IS BACKED UP |
| | HOW FREQUENT THE DATA IS BACKED UP |

DATA MANAGEMENT SYSTEM WITH CONSOLE MODULE

TECHNICAL FIELD

The present invention relates generally to archiving of computer data. More particularly, the present invention relates to a command module module for an enterprise data archiving system having multiple data sources, data repositories and policies.

BACKGROUND

Backup systems for computers are well known. Backup systems provide for the redundant storage of data, so that a computer can be restored to a previous state after an event that results in the loss of data on the computer. As those skilled in the art will appreciate, data stored on a computer can be very valuable and the loss of data can result in severe economic hardship.

Banks, stock brokerages, and other companies commonly store large amounts of data on computers. This data is vital to the day-to-day operations of such businesses. For example, it is easy to appreciate that a bank's account records, which are commonly stored in a computer, are necessary in order to facilitate the regular business transactions of the bank.

Events such as fires, earthquakes, thefts, and hard disk failures may result in the loss of valuable computer data. If the only copy of a company's data is stored on the affected computer, then the loss may be permanent and may have catastrophic consequences.

However, if the data was previously backed up, then the data may be restored, so that the routine operations of the business may continue with a minimum of disruption. Thus, the backing up of data stored on computers is considered necessary and has generally become routine.

Backup systems typically comprise a repository and software which drives the repository. The software is configured so as to copy all or a portion of the data from a computer to media of the repository. Various different types of repositories are in widespread use. Local backup drives and digital virtual devise (DVD or DVD ROM0 repositories are commonly used with smaller data storage requirements and tape storage or large disk drives are used on computers or in networks with large data storage requirements.

The networking of computers had, for a time, simplified the backup process by providing a central data storage location for multiple computers. That is, several client computers were commonly connected to a server and all of the data used by the client computers was stored in a central location by the server. Thus, only the single server needed to be backed up in order to adequately safeguard the data used by all of the client computers.

However, the data storage capacity of the client computers continues to increase and the number of clients on networks has increased, it eventually became more practical to store the large amounts of data required by client computers at the client computers themselves, rather than at the servers where bandwidth restrictions would limit the client computer's access to the data. Thus, we are once again faced with having to backup multiple client computers.

Additional legal and statutory requirements have also been put in place by government organizations through regulations and even local city and state ordinances have been placed requirements on how long data needs to be archived and saved and the type of data that needs to be archived and saved. For example, financial data may need to be archived every day and stored for a period of seven years where legal data can be archived every week and stored for a period of five years. Therefore, in a contemporary network, data may be backed up from a plurality of clients or even locations on a client computer, on a selected one of a plurality of different repositories at a plurality of different locations.

The traditional backup solutions have attempted to address some of these issues by providing the information technology manager (IT Manager) with the ability to manually setup policies for specific data to be saved at a specific location on a specific repository designed for long term storage on a very granular level. Unfortunately, this process is very tedious and is very impractical once one realizes how many types of data are on any given client, the numbers of regulations are on each type of data, how often the data must be archived and the best location to archive the data based on the requirements. Therefor it is desirable for the IT Manager to have an integrated data management system that has a central command module that enables the ability to establish data sources, in data paths to repositories with policies in a visual manner that enables a system view with the ability to also view on a granular level.

SUMMARY

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. According to a preferred aspect of the present invention is the development of an archiving management system that is designed around the user such that management occurs in a graphical manner.

According to one aspect, the present invention comprises a method for backing up data from a computer on a network, wherein the network comprises a plurality of network computers and a plurality of repositories. The method further comprises of having a command module which may reside on a data source node or a separate computer within the network and identifying at least one data source, identifying at least one storage devise, defining a data path between the data source and the repository, establishing the policies for the data and configuring them in a manner such that they can be communicated to a rules compiler which is enabled to compile the policies into rules that can be understood by a node manager that manages the at least one data source, at least one repository, and at least one data path and then providing the rules to a distributor to distribute the policies to such node manage such that they are implemented and followed.

Another aspect of the present invention is realized in a system that is provided and comprises a command module that contains a graphical user interface that is enabled to allow one to graphically identify at least one data source, graphically identify at least one storage devise, graphically identify a data path between the data source and the repository, and graphically establish the polices for the data.

Further the command module is smartly configured such that one can logically select a data source, logically select a storage devise and logically and graphically connect the data source and the repository graphically thereby enabling one to see the data path. Once the data path is selected one can choose on the data source, data path and/or the repository and define the policies all graphically through the command module's graphical user interface. The command module window is also enabled to run an animation to graphically confirm the data pathway that has been selected by the user.

Further the rules compiler is provided and smartly configured such that once the policies have been established for the data on the data source and the data path has been defined the rules compiler is enabled to read the policies form the command module and compile rules that can be understood and implemented by a node manager. The command module than passes those rules to a distributor who distributes the rules to the node managers.

Further a node manager is placed on each data source computer within the system network. The node manager is smartly configured to manage the data on the data source computer and implement rules provided by the rules compiler. Furthermore, the node manager applies the rules on all nodes, repositories, and data as instructed by the rules from the rules compiler.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Thus, the detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit of the invention.

The claims are thus to be understood to include what is specifically illustrated and described above, what is conceptually equivalent, what can be obviously substituted and also what essentially incorporates the essential idea of the invention.

The present invention is illustrated in FIGS. 1-5, which depict a presently preferred embodiment thereof. The Figures represent the invention but assumes the data management system is installed, and all relevant data sources and repositories are recognized and available.

Figure 1:
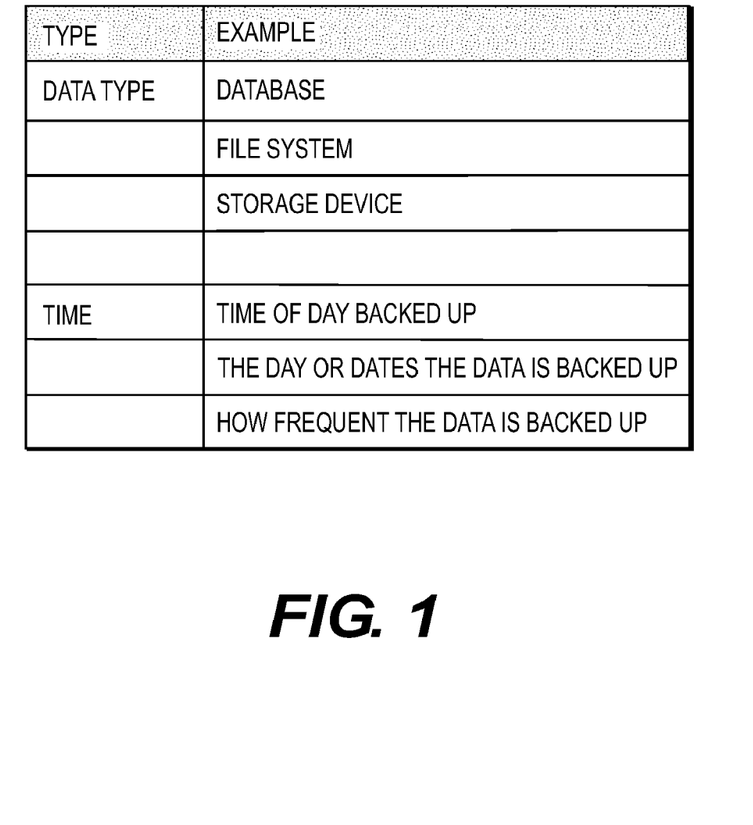
FIG. 1 is a table representing the type of policies one can choose.

The table in FIG. 1 represents some of the policies that are available and that can be logically placed on a data source node, a repository and a data path. Once a data source, a repository, a data path and an operation have been logically selected a user may choose from a number of predefined policy options as shown in the table (100). These options include but are not limited to the data type to be backed up or managed where such data types include databases, file systems and storage devices. Also as represented in FIG. 1 the time in which the data is backed up can be selected. Such time includes the references to the time of day the backup occurs. The day or date the data is backed up and how frequently the data is backed up.

Figure 2:
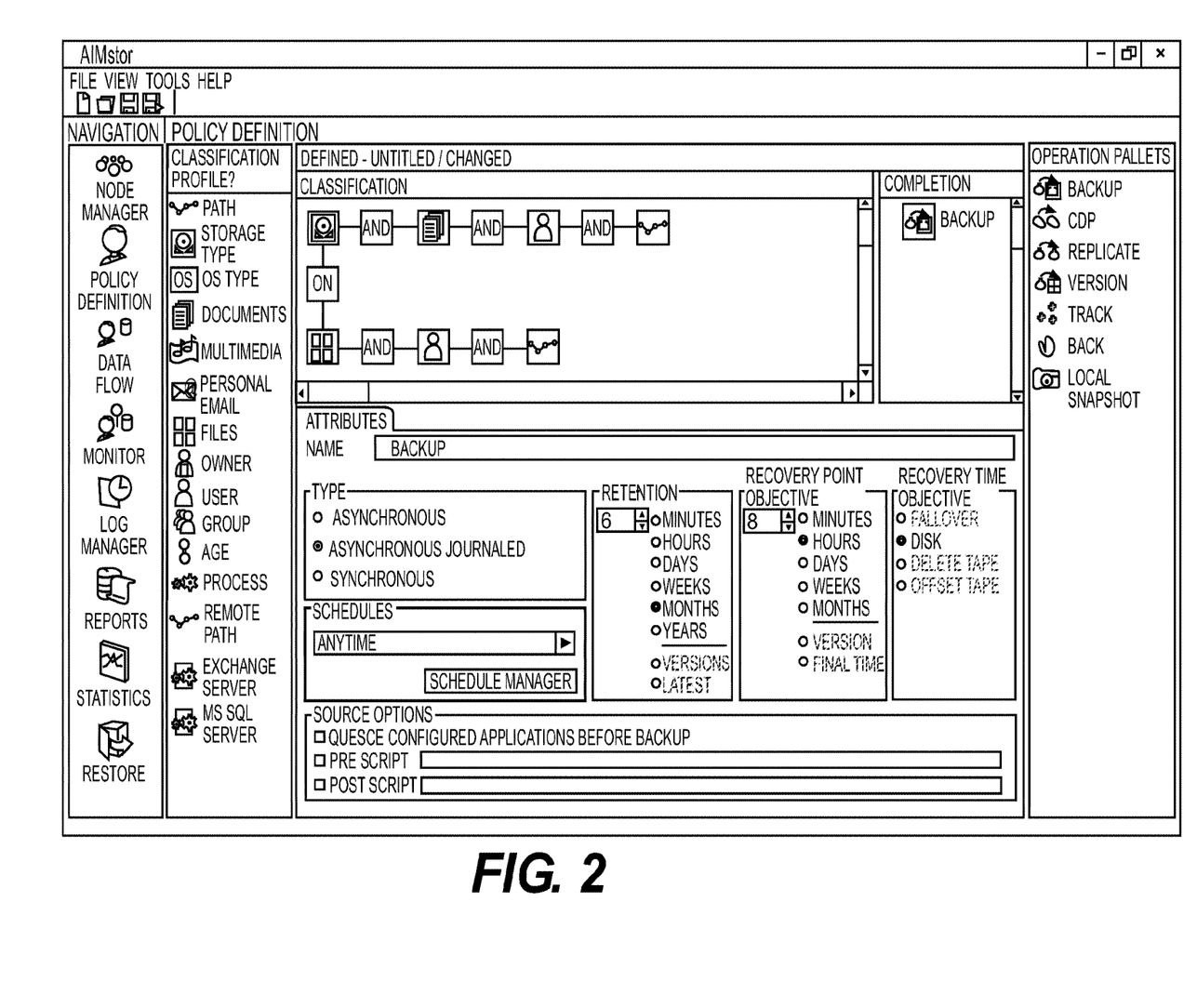
FIG. 2 an image representing the policy command module's graphical user interface.

In FIG. 2, which is an image, representing the Command Module window (200). The user can choose a logical data source node, a repository, a data path and the operation that shall occur with the data (i.e. backup, continuous data protection, replication) individually or collectively. The user chooses such logical data source node, repository and operation graphically by select ring the available and dragging them to the command modules graphical user interface. Furthermore the user can select a more granular backup graphically by choosing a storage device which is a type of data source and dragging it to the command modules graphical user interface and then causing user files on the storage device which is another type of data source and logically joining the storage device with the user files by way of a filter command which identifies that one wishes to backup the storage devise and the user files in this backup operation. As mentioned above the operations available in the command module's graphical user interface include but is not limited to backup, continuous data protection, replication and snapshots. As a part of the command modules graphical user interface on can choose to apply policies to each data type which may also include time. A user can then choose policies as represented in FIG. 1 to be applied on data stored on a data source node, a repository and how data is transferred through a data path. Such policies include but are not limited to specific policies for what data is managed, which policies should be placed on the data which resides on a data source, how that data will be copied to a repository and how long the repository will keep such data.

Figure 3:
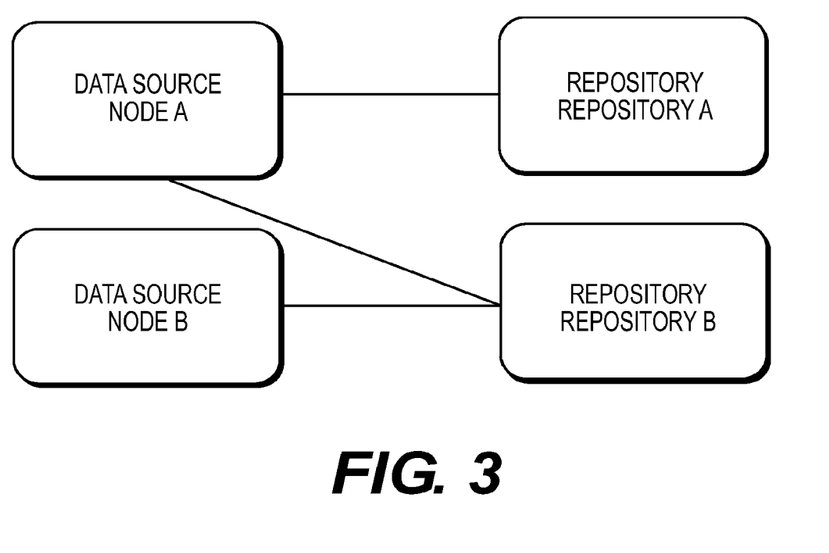
FIG. 3, represents a block diagram of the data flow one can choose in the management system.

The process as depicted in FIG. 3 relates to setting up and establishing the logical data flow which is a logical representation of the physical method in which data will travel from the data source to a repository. As represented in FIG. 3 a user identifies a data source, Data Source Node A (310) from a list of available data sources in the command module's graphical user interface and drags the Data Source Node A (310) into the command module window of the graphical user interface. The user will also select a repository, Repository A (320), and drags the Repository A (320) into the command module window. Additionally the system is smartly configured such that the user can then graphically chooses a logical data flow, Data Flow (350) which joins the Dats Sorce Node A (310) with the Repository A (320) such that a graphical representation can be shown of how the data will pass from the Data Source Node A (310) to the Respository A (320) by way of a Data Flow A (350). Additionally, as represented in FIG. 0.3 the user can choose multiple data sources as represented as Data Source Node B (330) and multiple Repositories as represented as Repository B (140) and multiple data pats as represented as Data Pat B (360) and Data Bath C (370).

Figure 4:
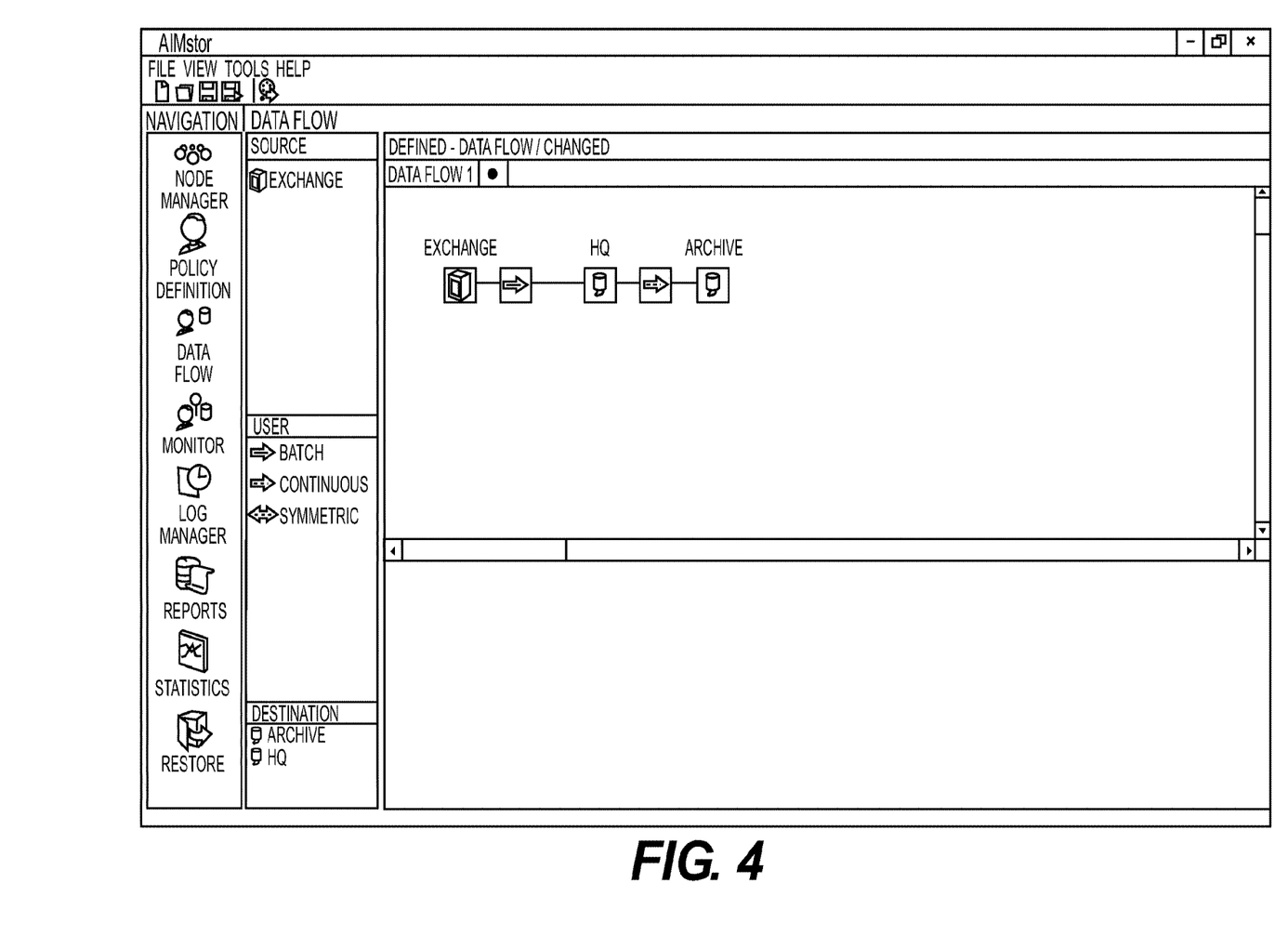
FIG. 4, is an image representing the data flow in the current invention.

FIG. 4 is an image, representing the Command Module window (400) for establishing data flow. The user can choose a data source node, a repository, and the data flow individually or collectively. A user can then choose policies as represented in FIG. 1 to be applied on data stored on a data source node, a repository and how the data is transferred through a data flow. Such policies include but are not limited to specific policies for what data is managed, which policies should be placed on the data which resides on a data source, how that data will be copied to a repository and how long the repository will keep such data.

Figure 5:
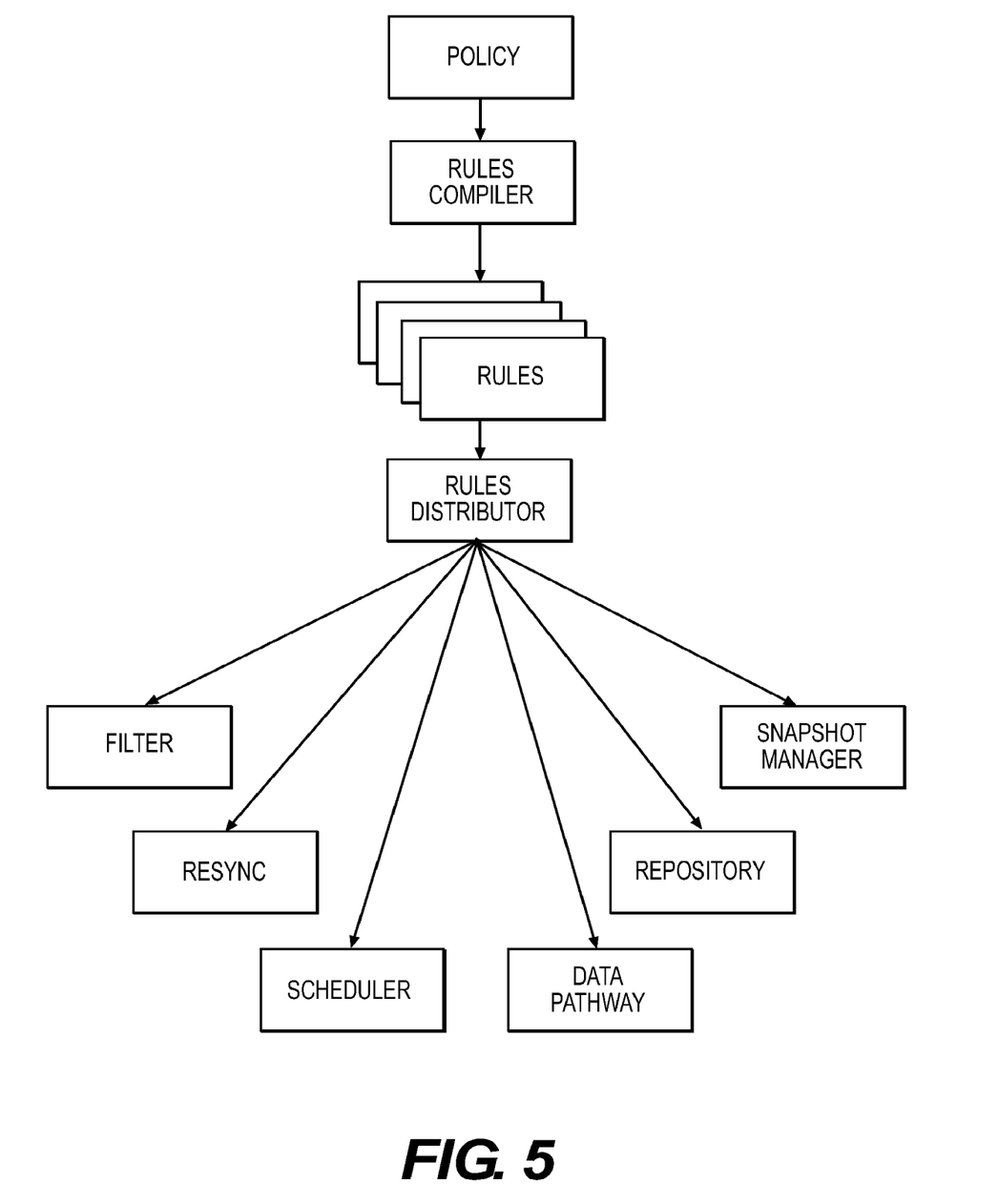
FIG. 5, is a flow chart which represents the flow in which policies are distributed.

FIG. 5 represents the flow in which things occur in the data management system. More specifically, once the Policy (510) is created which means that at least one logical data source is chosen, at least one logical repository is chosen and at least one operation is chosen and at least one policy has been assigned the Policy (510) then transfers the data in a manner that can be read by the Rules Compiler (520). The Rules Compiler (520) then translated the policies defined in the Policy ID (510) into rules such that they can be read by each of the resources within the data management system. Resources meaning a Filter (550), Resync (560), Scheduler (570), Data Path (580), Repository (590) and Snapshot Manager (595). The rules compiler also configures the data such that it can be read by the Rules Distributor (540) who then distributes the rules to each of the appropriate resources. As shown in FIG. 5 the Rules Distributor (540) distributes the rules as they are applicable to each resource as represented in FIG. 5 as the Filter (550), Resync (560), Scheduler (570), Data Path (580), Repository (590) and Snapshot Manager (595). In further implementation of the policies each resource is enabled to read the rules as it pertains to that resource and implement the rules as defined by the Policy (510).

What is claimed is:

1. A system comprising:
   a computer;
   a first data storage as a data source graphically chosen by a user on a window of a graphical user interface (GUI) from a plurality of displayed data sources; and
   a second data storage as a repository graphically chosen by the user on the window of the GUI from a plurality of displayed repositories,
   wherein the computer is operable to graphically identify a graphical logical data flow on the window of the GUI, the graphical logical data flow being graphically identified by graphically displaying icons on the window of the GUI for the graphical logical data flow, the icons displayed on the window of the GUI including icons for at least the data source, the repository and a data path, the data path being graphically identified between the data source and the repository,
   wherein, after the icons are displayed on the window of the GUI including icons for at least the data source, the repository and the data path between the data source and the repository, the computer is operable to receive an input from a user who can view the displayed graphical logical data flow and select a policy, from a plurality of policies displayed simultaneously with the icons on the window of the GUI as candidates, to be applied to data to be transferred from the data source to the repository of the displayed graphical logical data flow on the window of the GUI.

2. The system as recited in claim 1, wherein:
   the computer is operable to manage options for the type of policy to be chosen by the user, the options including a data type of the data.

3. The system as recited in claim 2, wherein:
   the data type has options of database, file systems or storage devices.

4. The system as recited in claim 1, wherein:
   the computer is operable to manage options for the type of policy to be chosen by the user, the options including a time at which the data is backed up.

5. The system as recited in claim 1, wherein:
   the computer is operable to transfer the data from the data source to the repository according to the chosen policy.

6. A non-transitory computer readable storage medium comprising:
   code for graphically identifying a graphical logical data flow on a window of a graphical user interface (GUI), the graphical logical data flow being graphically identified by graphically displaying icons for the graphical logical data flow on the window of the GUI, the icons being provided on the window of the GUI and including icons for a data source, a repository and a data path chosen by a user, the data path being graphically identified between the data source and the repository; and code for, after the icons are displayed on the window of the GUI including icons for at least the data source, the repository and the data path between the data source and the repository, receiving an input from a user who can view the displayed graphical logical data flow and select a policy, from a plurality of policies displayed simultaneously with the icons on the window of the GUI as candidates, to be applied to data to be transferred from the data source to the repository of the displayed graphical logical data flow on the window of the GUI.

7. The non-transitory computer readable storage medium as recited in claim 6, the non-transitory computer readable storage medium further comprising:

code for managing options for the type of policy to be chosen by the user, the options including a data type of the data.

8. The non-transitory computer readable storage medium as recited in claim 7, wherein:

the data type has options of database, file systems or storage devices.

9. The non-transitory computer readable storage medium as recited in claim 6, the non-transitory computer readable storage medium further comprising:

code for managing options for the type of policy to be chosen by the user, the options including a time at which the data is backed up.

10. The non-transitory computer readable storage medium as recited in claim 6, the non-transitory computer readable storage medium further comprising:

code for transferring the data from the data source to the repository according to the chosen policy.

11. A system comprising:

a computer;

a first data storage as a first type resource of plural types of resources graphically selected by a user on a window of a graphical user interface (GUI); and a second data storage as a second type resource of the plural types of resources graphically selected by the user on the window of the GUI, wherein the computer is operable to graphically identify a graphical logical data flow on the window of the GUI, the graphical logical data flow being graphically identified by graphically displaying icons on the window of the GUI for the graphical logical data flow, the icons displayed on the window of the GUI including icons of the plural types of resources including at least the first type resource, the second type resource and a data path, the data path being graphically identified between the first type resource and the second type resource;

wherein, after the icons are displayed on the window of the GUI including icons for at least the first type resource, the second type resource and the data path between the first type resource and the first type resource, the computer is operable to receive an input from a user who can view the displayed graphical logical data flow and select a policy, from a plurality of policies displayed simultaneously with the icons on the window of the GUI as candidates, to be applied to data to be transferred from the first type resource to the second type resource of the displayed graphical logical data flow.

12. The system as recited in claim 11, wherein:

the computer is operable to manage options for the type of policy to be chosen by the user, the options including a data type of the data.

13. The system as recited in claim 12, wherein:

the data type has options of database, file systems or storage devices.

14. The system as recited in claim 11, wherein:

the computer is operable to manage options for the type of policy to be chosen by the user, the options including a time at which the data is backed up.

15. The system as recited in claim 11, wherein:

the computer is operable to transfer the data from the first type resource to the second type resource according to the chosen policy.

16. A non-transitory computer readable storage medium comprising:

code for graphically identifying a graphical logical data flow on a window of a graphical user interface (GUI), the graphical logical data flow being graphically identified by graphically displaying icons for the graphical logical data flow on the window of the GUI, the icons being provided on the window of the GUI and including icons for at least a first type resource, a second type resource and a data path chosen by a user, the data path being graphically identified between the first type resource and the second type resource; and code for, after the icons are displayed on the window of the GUI including icons for at least the first type resource, the second type resource and the data path between the first type resource and the first type resource, receiving an input from a user who can view the displayed graphical logical data flow and select a policy, from a plurality of policies displayed simultaneously with the icons on the window of the GUI as candidates, to be applied to data to be transferred from the first type resource to the second type resource of the displayed graphical logical data flow on the window of the GUI.

17. The non-transitory computer readable storage medium as recited in claim 16, the non-transitory computer readable storage medium further comprising:

code for managing options for the type of policy to be chosen by the user, the options including a data type of the data.

18. The non-transitory computer readable storage medium as recited in claim 17, wherein:

the data type has options of database, file systems or storage devices.

19. The non-transitory computer readable storage medium as recited in claim 16, the non-transitory computer readable storage medium further comprising:

code for managing options for the type of policy to be chosen by the user, the options including a time at which the data is backed up.

20. The non-transitory computer readable storage medium as recited in claim 16, the non-transitory computer readable storage medium further comprising:

code for transferring the data from the first type resource to the second type resource according to the chosen policy.

* * * * *